No. 839,495. PATENTED DEC. 25, 1906.
F. W. MERRICK.
HANDLE OR HOLDER FOR KNIFE BLADES OR OTHER TOOLS.
APPLICATION FILED JULY 25, 1904.
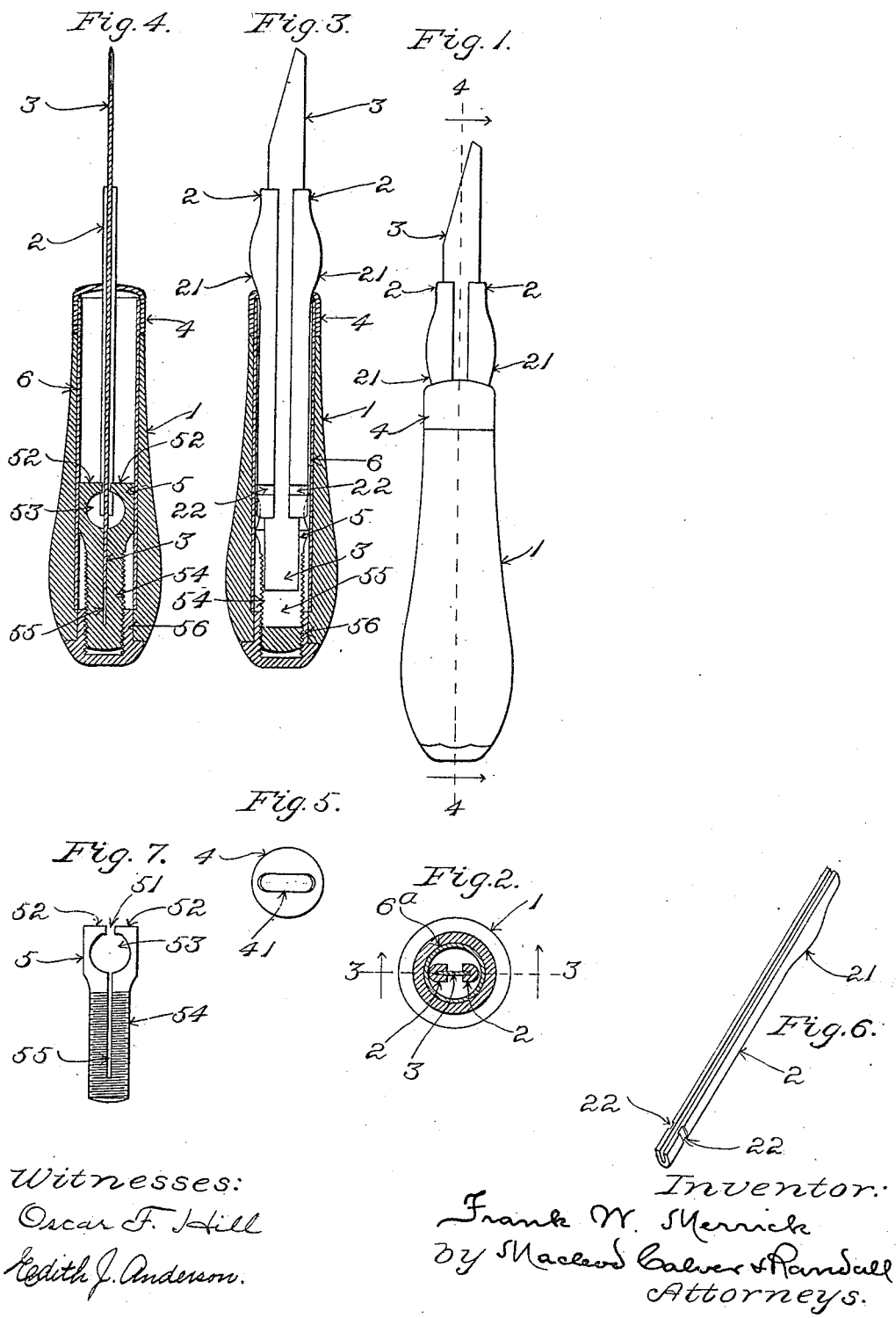

UNITED STATES PATENT OFFICE.

FRANK W. MERRICK, OF BOSTON, MASSACHUSETTS.

HANDLE OR HOLDER FOR KNIFE-BLADES OR OTHER TOOLS.

No. 839,495.     Specification of Letters Patent.     Patented Dec. 25, 1906.

Application filed July 25, 1904. Serial No. 217,963.

*To all whom it may concern:*

Be it known that I, FRANK W. MERRICK, a citizen of the United States, residing at Boston, in the county of Suffolk, State of Massachusetts, have invented a certain new and useful Improvement in Handles or Holders for Knife-Blades and other Tools, of which the following is a specification, reference being had therein to the accompanying drawings.

The invention consists, essentially, in a handle or holder having an adjusting-screw of novel and improved construction for securing the opposite clamps or jaws thereof in place and also enabling the said clamps or jaws to be operated to clasp or release, as the case may be, the portion of knife-blade or tool-shank which has been placed between them. The important characteristics of the said adjusting-screw are a head portion, formed with a transverse opening therethrough to receive the shouldered ends of the clamps or jaws by a lateral insertion and a threaded shank, and a longitudinal slot through the headed end and extending substantially throughout the length of the shank portion. The said slot is designed to receive the butt-end of a knife-blade, so as to enable the handle to have applied thereto a knife-blade of the full commercial length.

The invention is illustrated by the accompanying drawings, in which—

Figure 1 shows in side elevation a handle or holder provided with my invention and having a knife-blade applied thereto. Fig. 2 is a view thereof in horizontal cross-section on line 2 2 in Fig. 1. Fig. 3 is a view chiefly in vertical cross-section on the plane indicated by the dotted line 3 3 of Fig. 2 looking in the direction that is indicated by the arrows at the ends of such line, the clamps or jaws being in elevation. Fig. 4 is a view in vertical cross-section on the plane indicated by the dotted line 4 4 of Fig. 1 looking in the direction that is indicated by the arrows at the ends of such line. Fig. 5 is a plan of the ferrule detached. Fig. 6 is an isometric of one of the clamps or jaws shown separately. Fig. 7 is an elevation of the device by which the clamps or jaws are held and adjusted in the construction that is represented in Figs. 1 to 4.

Having reference to the drawings, the shell or hollow body of the handle or holder represented in the drawings is designated 1, the jaws or clamps thereof being indicated at 2 2 and a knife-blade at 3. The said jaws or clamps 2 2 are contained for the greater portion of their length, within the central chamber or bore of the shell or body 1. They are in the main of well-known character, each thereof in the present instance being grooved lengthwise to receive and inclose within its groove and between its side flanks an edge portion of the knife-blade, and the said knife-blade in being applied to the handle or holder being fitted within the jaws or clamps in the usual manner, as indicated in Figs. 1, 2, 3, and 4. At the upper end of the shell or body 1 is located the ferrule 4, the latter having the transverse slot 41 in its end wall. (See Fig. 5.) The said jaws or clamps pass through the slot 41 and beyond the ferrule are formed with the exterior swells or enlargements 21 21 to bear against the respective ends of the wall of the said slot, the said swells or enlargements coöperating with the said ends when the jaws or clamps are moved lengthwise into the shell or body to force the jaws or clamps toward each other so as to grip the knife-blade between them. When the jaws or clamps are moved lengthwise in the opposite direction, the swells or enlargements are withdrawn from contact with the ends of slot 41, and the knife-blade is released.

When the handle or holder is to be employed for other tools than knife-blades, the portions of the jaws or clamps which engage with the said tools will be formed suitably to receive and hold the latter. The jaws or clamps 2 2 at their inner ends are in engagement with a head or block which in Figs. 3, 4, and 7 is designated 5. In order to effect such engagement, the said head or block is slotted transversely or diametrically at its upper end, as at 51, Fig. 7, the slot extending entirely across and being open at one or both ends thereof, and for the purpose of producing at the upper end of the head or block one or a pair of retaining-lips 52 52, Figs. 4 and 7, an enlarged transverse or diametrical opening is formed through the head or block adjacent the end, as at 53 in Figs. 4 and 7. The said lip or lips extend continuously across the upper end of the head or block. For the reception of the retaining lip or lips of the head or block one or both of the side flanks of each jaw or clamp 2 2 is exteriorly grooved transversely across the same, as at 22 22, Fig. 6, transverse shoulders being formed above and below the grooves for engagement with the lip or lips of the head or block. The entrance of the said retaining lip or lips into the said groove or grooves is occasioned by a relative transverse movement of the jaws or clamps and head or block with respect to each other and disengagement of the jaws or clamps, or either of them, from the head or block is effected in like manner. The illustrated construction of the head or block permits both of the jaws to be introduced in place in connection with the lip or lips or withdrawn therefrom at either side of the head or block. When the knife-blade or other tool is entered between the jaws or clamps, the inner end thereof may be caused to project within the slot 51 and opening 53. Thereby a portion of the length of the said knife-blade or other tool is accommodated. The shape and size of opening 53 and the amount of its extension in the direction of the length of the holder or handle may vary in practice. The screw-threaded stem 54 is of considerable length, and a continuation of the opening 53 is formed lengthwise of the said stem by a slit 55, Figs. 3, 4, and 7, within which the inner end of the knife-blade or other tool will project, as indicated in Figs. 3 and 4. The threaded stem of the head or block is engaged by a hollow or interior screw 56, Figs. 3 and 4, that is fixedly fitted within the butt-end or lower end of the holder or handle, the said screw 56 being preferably a cap-screw with closed outer end, whereby the opening or bore of the body or shell is closed, as represented in the drawings. By grasping the projecting ends of the jaws or clamps with one hand and the body or shell with the other and turning the former with relation to the latter the stem 54 will be screwed either into or out of the hollow screw 56, as the case may be, and thereby the head or block and jaws or clamps will be adjusted lengthwise with respect to the body or shell and ferrule, the jaws or clamps being moved positively in each direction of adjustment. The body or shell preferably is reinforced by means of a tube or bushing of brass or other suitable metal, as at 6, Figs. 3 and 4, serving to strengthen the body or shell and also to take the wear that is incident to the movements of the jaws and head or block within the same. When the tube or bushing is employed, the ferrule 4 preferably is fitted to the upper end thereof, such end projecting beyond the corresponding end of the body or shell and the ferrule turning thereon. The head or block fits closely within the tube or bushing, which latter confines the head or block from spreading during the operation of tightening the hold of the jaws or clamps upon the knife-blade or other tool between them. The liability to spread is increased by the slit 55 extending lengthwise of screw 54. It is due to the tendency of the jaws or clamps to turn within the slot of the head or block, so as to widen such slot, in effecting the adjustment, and in part to the tendency of the portions of the head or block at opposite sides of the slot and opening to move away from each other under the longitudinal strain that is incident to the tightening.

It will be perceived that the adjusting-screw is characterized by being slotted transversely as contradistinguished from being centrally bored longitudinally, as in the case of corresponding parts of prior handles of the general class to which the invention relates. The transverse slotting permits the stem or body of the screw to be made smaller than heretofore in like instances. It may be only slightly greater in diameter than the width of the blade. In addition the extreme or butt end may be left integral, uniting the portions at opposite sides of the slot. The slotting is more convenient and less expensive than the boring.

One particular advantage of my improved construction is the fact that by having the transverse opening through the head portion of the adjusting-screw, whereby the clamps or jaws are permitted to be applied by a transverse insertion and similarly to be removed, it is rendered feasible and convenient to substitute a pair of jaws of a given size for another pair of different size to accommodate different widths of blades. In practice about six different sizes of blades for shoemakers' use are supplied, varying from one-eighth to three-eighths of an inch in width. Heretofore the custom has been to make different sizes of handles to accommodate the different widths of blades. With the head portion of the adjusting-screw constructed to permit transverse insertion and removal of the clamps or jaws, as aforesaid, I am able in practice by means of one handle and three pairs of jaws varying in size to accommodate all the different widths of blades that are sold in the market.

I claim as my invention—

1. As an article of manufacture an adjusting-screw for drawing the clamping-jaws of a handle for shoemakers' knives and similar tools, comprising a head portion having the transverse opening therethrough to receive the shouldered ends of said jaws by a lateral insertion, and a threaded shank, and slotted longitudinally through the headed end substantially throughout its length.

2. In a handle for shoemakers' knives and similar tools, in combination with the tubular body portion and the clamping-jaws having the grooved and shouldered inner ends, the adjusting-screw for drawing the said clamping-jaws, comprising a head portion having the transverse opening therethrough to receive the shouldered ends of said jaws by a lateral insertion, and a threaded shank, and slotted longitudinally through the headed end substantially throughout its length.

In testimony whereof I affix my signature in presence of two witnesses.

FRANK W. MERRICK.

Witnesses:
CHAS. F. RANDALL,
EDITH J. ANDERSON.